(12) United States Patent
Chandra et al.

(10) Patent No.: US 8,892,951 B2
(45) Date of Patent: Nov. 18, 2014

(54) FAULT LOCALIZATION FOR DATA-CENTRIC PROGRAMS

(75) Inventors: Satish Chandra, Bangalore (IN); Pankaj Dhoolia, Uttar Pradesh (IN); Mangala Gowri Nanda, New Delhi (IN); Diptikalyan Saha, New Dehli (IN); Vibha Singhal Sinha, New Dehli (IN); Krishna Nandivada Venkata, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/247,301

(22) Filed: Sep. 28, 2011

(65) Prior Publication Data
US 2013/0080837 A1    Mar. 28, 2013

(51) Int. Cl.
  *G06F 11/00* (2006.01)
  *G06F 11/07* (2006.01)
  *G06F 11/36* (2006.01)

(52) U.S. Cl.
  CPC .......... *G06F 11/366* (2013.01); *G06F 11/0751* (2013.01)
  USPC ...................................... 714/38.1

(58) Field of Classification Search
  CPC ............ G06F 11/3636; G06F 11/3684; G06F 11/3676; G06F 11/3664; G06F 11/3692
  USPC ...................................... 714/38.1
  See application file for complete search history.

(56) References Cited

U.S. PATENT DOCUMENTS

| | | | |
|---|---|---|---|
| 5,412,802 A | 5/1995 | Fujinami et al. | |
| 6,292,940 B1 * | 9/2001 | Sato | 717/157 |
| 6,889,368 B1 | 5/2005 | Mark et al. | |
| 7,703,077 B2 * | 4/2010 | Rehof et al. | 717/127 |
| 8,656,370 B2 * | 2/2014 | Murthy et al. | 717/132 |
| 2002/0059567 A1 * | 5/2002 | Minamide et al. | 717/151 |
| 2004/0172624 A1 * | 9/2004 | Michimoto et al. | 717/140 |
| 2007/0168984 A1 * | 7/2007 | Heishi et al. | 717/124 |
| 2007/0294074 A1 * | 12/2007 | Ciolfi | 703/21 |
| 2008/0127200 A1 * | 5/2008 | Richards et al. | 718/106 |
| 2011/0016456 A1 | 1/2011 | Artzi et al. | |
| 2011/0016457 A1 | 1/2011 | Artzi et al. | |
| 2011/0030061 A1 | 2/2011 | Artzi et al. | |
| 2011/0283147 A1 * | 11/2011 | Prasad et al. | 714/38.1 |

OTHER PUBLICATIONS

Dictionary definition for "compiler" fom wikipedia from http://en.wikipedia.org/wiki/Compiler, retrieved on Mar. 22, 2013.*
Dictionary definition for "interpreter" fom wikipedia from http://en.wikipedia.org/wiki/Interpreter_(computing), retrieved on Mar. 22, 2013.*
Dictionary definition for "parser" fom wikipedia from http://en.wikipedia.org/wiki/Parser, retrieved on Mar. 22, 2013.*
Agrawal, H. et al., "Dynamic Program Slicing," Proceedings of the ACM SIGPLAN'90 Conference on Programming Language Design and Implementation, White Plains, New York, USA, Jun. 20-22, 1990, pp. 1-11.

(Continued)

*Primary Examiner* — Yair Leibovich
(74) *Attorney, Agent, or Firm* — Ference & Associates LLC (57) ABSTRACT

Methods and arrangements for localizing faults in programs. A program is assimilated, the program comprising statements. Output behavior of the statements is modeled, and statement occurrences are annotated. Passing and failing spectra are differenced to yield a difference, and a fault is located via employing the difference.

8 Claims, 7 Drawing Sheets

(56) References Cited

OTHER PUBLICATIONS

Agrawal, H. et al., "Fault Localization using Execution Slices and Dataflow Tests," Proceedings of the Sixth International Symposium on Software Reliability Engineering (ISSRE95), Toulouse, France, Oct. 1995, pp. 143-151.

Ball, T. et al., "From Symptom to Cause: Localizing Erros in Counterexample Traces," POPL'03, Jan. 15-17, 2003, New Orleans, Louisiana, USA, 9 pages, ACM.

Chandra, S. et al., "Angelic Debugging," ICSE'11, May 21-28, 2011, Waikiki, Honolulu, HI, USA, 11 pages, ACM.

Debroy, V. et al., "Using Mutation to Automatically Suggest Fixes for Faulty Programs," Third International Conference on Software Testing, Verification and Validation, 2010, pp. 65-74, IEEE Computer Society.

Do, H. et al., "On the Use of Mutation Faults in Empirical Assessments of Test Case Prioritization Techniques," IEEE Transactions on Software Engineering, Sep. 2006, pp. 733-752, vol. 32, No. 9, IEEE Computer Society.

Dor, N. et al., "Customization Change Impact Analysis for ERP Professionals via Program Slicing," ISSTA'08, Jul. 20-24, 2008, Seattle, Washington, USA, 11 pages, ACM.

Jones, J. A. et al., "Empirical Evaluation of the Tarantula Automatic Fault-Localization Technique," ASE'05, Nov. 7-11, 2005, Long Beach, California, USA, 10 pages, ACM.

Kamkar, M. et al., "Interprocedural Dynamic Slicing Applied to Interprocedural Data Flow Testing," IEEE, 1993, pp. 386-395.

Korel, B. et al., "Dynamic Program Slicing," Information Processing Letters, Oct. 26, 1998, pp. 155-163, vol. 29, Elsevier Science Publishers B. V., North-Holland.

Litvak, S. et al., "Field-Sensitive Program Dependence Analysis," FSE-18, Nov. 7-11, 2010, Santa Fe, New Mexico, USA, 10 pages, ACM.

Liu, C. et al., "Statistical Debugging: A Hypothesis Testing-Based Approach," IEEE Transactions on Software Engineering, Oct. 2006, pp. 1-17, vol. 32, No. 10, IEEE Computer Society.

Mani, S. et al., "Automated Support for Repairing Input-Model Faults," ASE'10, Sep. 20-24, 2010, Antwerp, Belgium, pp. 195-204, ACM.

Reps, T. et al., "The Use of Program Profiling for Software Maintenance with Applications to the Year 2000 Problem," Proceedings of ESEC/FSE 97: Lec. Notes in Comp. Sci., 1997, 18 pages, Springer-Verlag, New York, New York, USA.

Saha, D. et al., "Fault localization in ABAP Programs," IBM Research Report, RI11004, Computer Science, Feb. 2011, pp. 1-27, IBM T.J. Watson Research Center Publications, Yorktown Heights, New York, USA.

Sharygina, N. et al., "A Combined Testing and Verification Approach for Software Reliability," Proceedings of FME 2001, LNCS 2021, 2001, pp. 611-628, Springer-Verlag, Berlin/Heidelberg, Germany.

Venkatesh, G. A., "The Semantic Approach to Program Slicing," Proceedings of the ACM SIGPLAN'91 Conference on Programming Language Design and Implementation, Toronto, Ontario, Canada, Jun. 26-28, 1991, pp. 107-119, ACM.

Zeller, A., "Isolating Cause-Effect Chains from Computer Programs," SIGSOFT 2002/FSE-10, Nov. 18-22, 2002, Charleston, South Carolina, USA, 10 pages, ACM.

Zhang, X. et al., "Cost Effective Dynamic Program Slicing," PLDI'04, Jun. 9-11, 2004, Washington, DC, USA, 13 pages, ACM.

Hu, Peifeng, et al., "Fault Localization with Non-Parametric Program Behavior Model", Proceedings of the 8th International Conference on Quality Software, Aug. 12-13, 2008, 11 pages, IEEE Computer Society Press, Los Alamitos, California, USA.

Abreu, Rui, et al., "A Dynamic Modeling Approach to Software Multiple-Fault Localization", 8 pages, availalbe at http://www.esi.nl/publications/trader/Abreu_DX08.pdf as of Sep. 9, 2011.

Abreu, Rui, et al., "Automatic Software Fault Localization using Generic Program Invariants", The Software Engineering Track. at The 23rd Annual ACM Symposium on Applied Computing (SAC 2008), Mar. 16-20, 2008, 6 pages, Fortaleza, Ceara, Brazil.

Yilmaz, Cemal, et al., "Time Will Tell: Fault Localization Using Time Spectra", 30th International Conference on Software Engineering (ICSE'08), May 10-18, 2008, pp. 81-90, Leipzig, Germany.

Andrews, James H. et al., "Using Mutation Analysis for Assessing and Comparing Testing Coverage Criteria", IEEE Transactions on Software Engineering, Aug. 2006, pp. 608-624, vol. 32, No. 8, IEEE Computer Society, Digital Database.

Cleve, Anthony, "Program Analysis and Transformation for Data-Intensive System Evolution", 26th IEEE International Conference on Software Maintenance, Sep. 12-18, 2010, Timisoara, Romania, pp. 1-6, IEEE Computer Society, Digital Database.

Cleve, Anthony, et al., "Dynamic Analysis of SQL Statements for Data-Intensive Applications Reverse Engineering", 2008 15th Working Conference on Reverse Engineering, Oct. 15-18, 2008, Antwerp, Belgium, pp. 192-196, IEEE Computer Society, Digital Database.

Renieris, Manos, et al., "Fault Localization With Nearest Neighbor Queries", Proceedings of the 18th IEEE International Conference on Automated Software Engineering (ASE'03), Oct. 6-10, 2003, Montreal, Quebec, Canada, pp. 30-39, IEEE Computer Society, Digital Database.

Zhang, Xiangyu, et al., "Precise Dynamic Slicing Algorithms", Proceedings of the 25th International Conference on Software Engineering (ICSE'03), May 3-10, 2003, Portland, Oregon, USA, pp. 319-329, IEEE Computer Society, Digital Database.

Jin, Hoonsang et al., "Fate and Free Will in Error Traces", Tools and algorithms for the construction and analysis of systems: 8th International Conference, TACAS 2002, held as part of the Joint European Conferences on Theory and Practice of Software, ETAPS 2002, Grenoble, France, Apr. 8-12, 2002, 17 pages, Issue No. 2280, Springer-Verlag Berlin Heidelberg, Germany.

Lyle, James R. et al., "Automatic Program Bug Location by Program Slicing", The Second International Conference on Computers and Applications, Jun. 23-27, 1987, Beijing (Peking), Peoples' Republic of China, 8 pages, IEEE Digital Database.

Harrold, Mary Jean et al., "An empirical investigation of the relationship between spectra differences and regression faults", Software testing, verification & reliability (STVR), 2000, 25 pages, vol. 10, John Wiley & Sons, Ltd., Hoboken, New Jersey, USA.

Groce, Alex et al., "What Went Wrong: Explaining Counterexamples", Model checking software: 10th International Spin Workshop, Portland, OR, USA, May 9-10, 2003, 17 pages, Springer-Verlag Berlin Heidelberg, Germany.

Basu, Samik et al., "Localizing Program Errors for Cimple Debugging", Formal techniques for networked and distributed systems—FORTE 2004: 24th IFIP WG 6.1 International conference, Madrid, Spain, Sep. 27-30, 2004, 20 pages, vol. 3235, IFIP International Federation for Information Processing 2004.

\* cited by examiner

```
1   CstID ItemID Price Year from OrderTab INTO itab
2   CstID Discount Year from DiscountTab INTO stab
3
4   SORT itab
5   DELETE from itab where Year <= CurrentYear -2
6   LOOP itab
7
8
9
10  SUM Price
11  READ stab INTO fa WHERE CstId = wa.CstID
12
13  SUBTRACT Price – Discount = Total
14
15
16  PRINT Total
17
18
```

OrderTab/tab

| CstId | ItemId | Price | Year |
|---|---|---|---|
| 1 | I1 | 10.0 | 2010 |
| 2 | I5 | 10.0 | 2011 |

DiscountTab/tab

| CstId | Discount | Year |
|---|---|---|
| 1 | 2.0 | 2009 |
| 1 | 1.0 | 2010 |
| 2 | 3.0 | 2011 | x [ ≠ 10.0 – 2.0]
[7.0 ✓ = 10.0 – 3.0]

Output

| CstId | Amount |
|---|---|
| 1 | 8.0 |
| 2 | 7.0 |

FAULT LOCALIZATION FOR DATA-CENTRIC PROGRAMS

BACKGROUND

Bug resolution is an important activity in any software maintenance project. Bug resolution for problems reported on applications already in use (or in production) has two main implications. First, a client may discover a bug in the field, whereupon it needs to be fixed urgently. Therefore, it is important to have good tool support that can help the programmer debug the program as quickly as possible, especially when the person who is debugging the code is not the programmer who originally wrote the code. Secondly, a bug can surface despite the fact that the code has been tested and has probably been running in the field for some time. That means it is likely to be an unanticipated corner case in otherwise correct code, and automated tools can focus their effort on identifying such corner cases. To date, conventional arrangements have been far from adequate in addressing these considerations.

BRIEF SUMMARY

In summary, one aspect of the invention provides a method comprising: assimilating a program, the program comprising statements; modeling output behavior of the statements; annotating statement occurrences; differencing passing and failing spectra to yield a difference; and locating a fault via employing the difference.

Another aspect of the invention provides an apparatus comprising: computer readable program code configured to assimilate a program, the program comprising statements; computer readable program code configured to model output behavior of the statements; computer readable program code configured to annotate statement occurrences; computer readable program code configured to difference passing and failing spectra to yield a difference; and computer readable program code configured to locate a fault via employing the difference.

An additional aspect of the invention provides a computer program product comprising: a computer readable storage medium having computer readable program code embodied therewith, the computer readable program code comprising: computer readable program code configured to assimilate a program, the program comprising statements; computer readable program code configured to model output behavior of the statements; computer readable program code configured to annotate statement occurrences; computer readable program code configured to difference passing and failing spectra to yield a difference; and computer readable program code configured to locate a fault via employing the difference.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-5. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

In accordance with at least one embodiment of the invention, techniques broadly contemplated herein can address a wide variety of programs and programming errors, and can especially be applied to aid in faster resolution of programming errors reported for ABAP (Advanced Business Application Programming) programs. ABAP is a widely used proprietary language used in SAP-ERP systems (which use ERP, or enterprise resource planning software as manufactured by SAP AG of Waldorf, Germany), and is heavily data-centric in the tradition of PL/SQL and COBOL. Data-centric programs process large collections of data that typically originate from a database. ABAP contains both imperative and declarative syntax. The declarative syntax is similar to SQL and allows developer to do complex operations on collections of data. Henceforth, declarative SQL-like commands in ABAP are referred to variously herein as database statements. As the discussion proceeds, it should be understood that, to the extent that ABAP is set forth by way of example, it is discussed non-restrictively and merely by way of illustration and, indeed, embodiments of the invention can apply to a very wide variety of data-centric programs.

Figure 1:
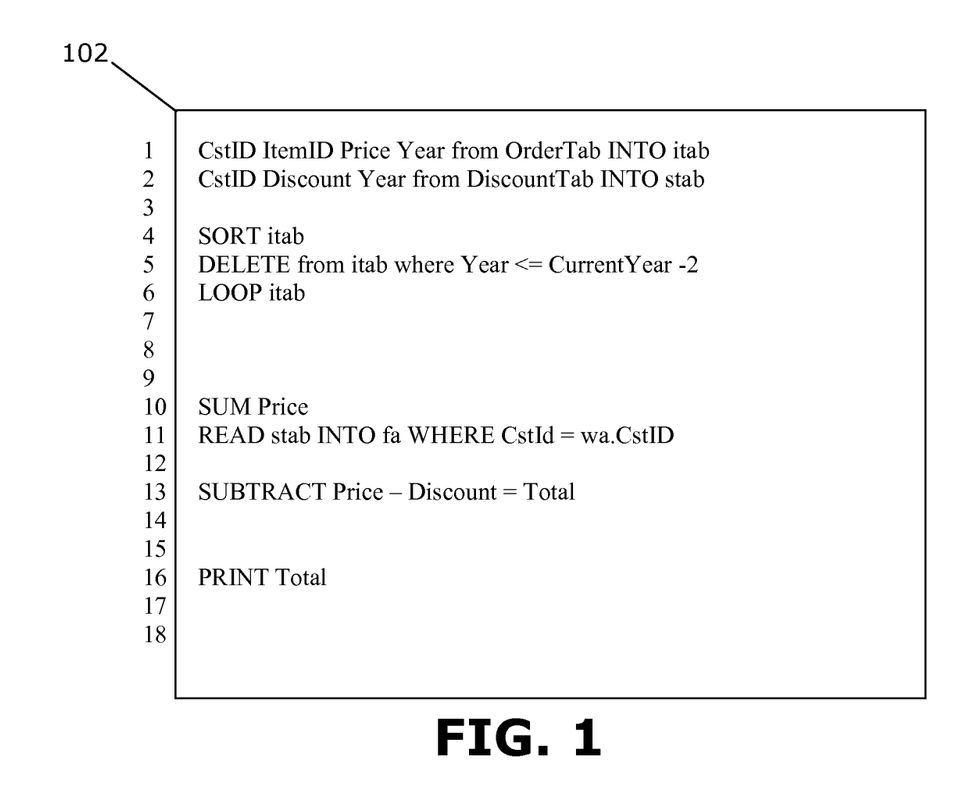
FIG. 1 depicts a sample program.
Figure 2:
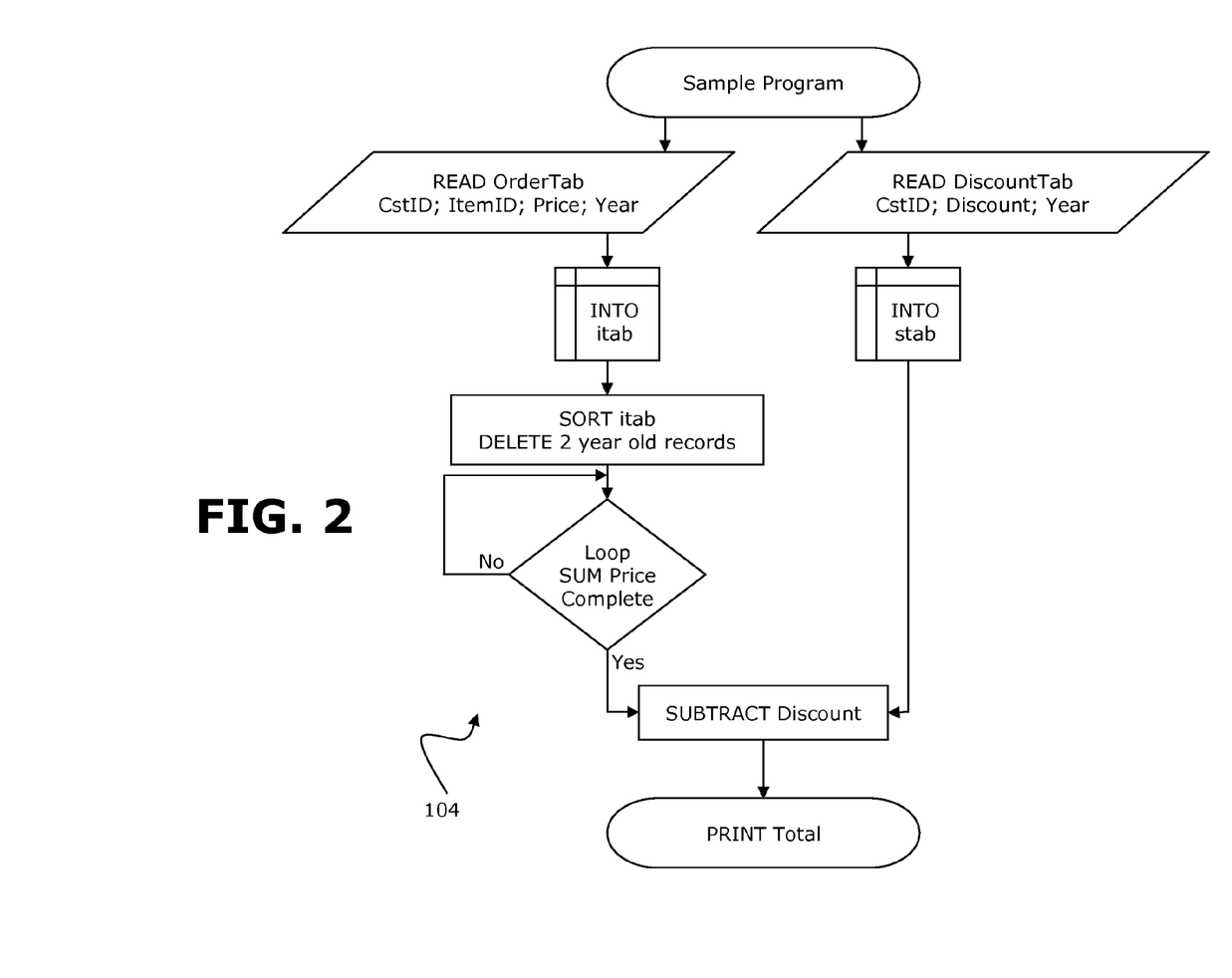
FIG. 2 provides a flow chart explaining the steps of each of the commands of the program of FIG. 1.
Figure 3:
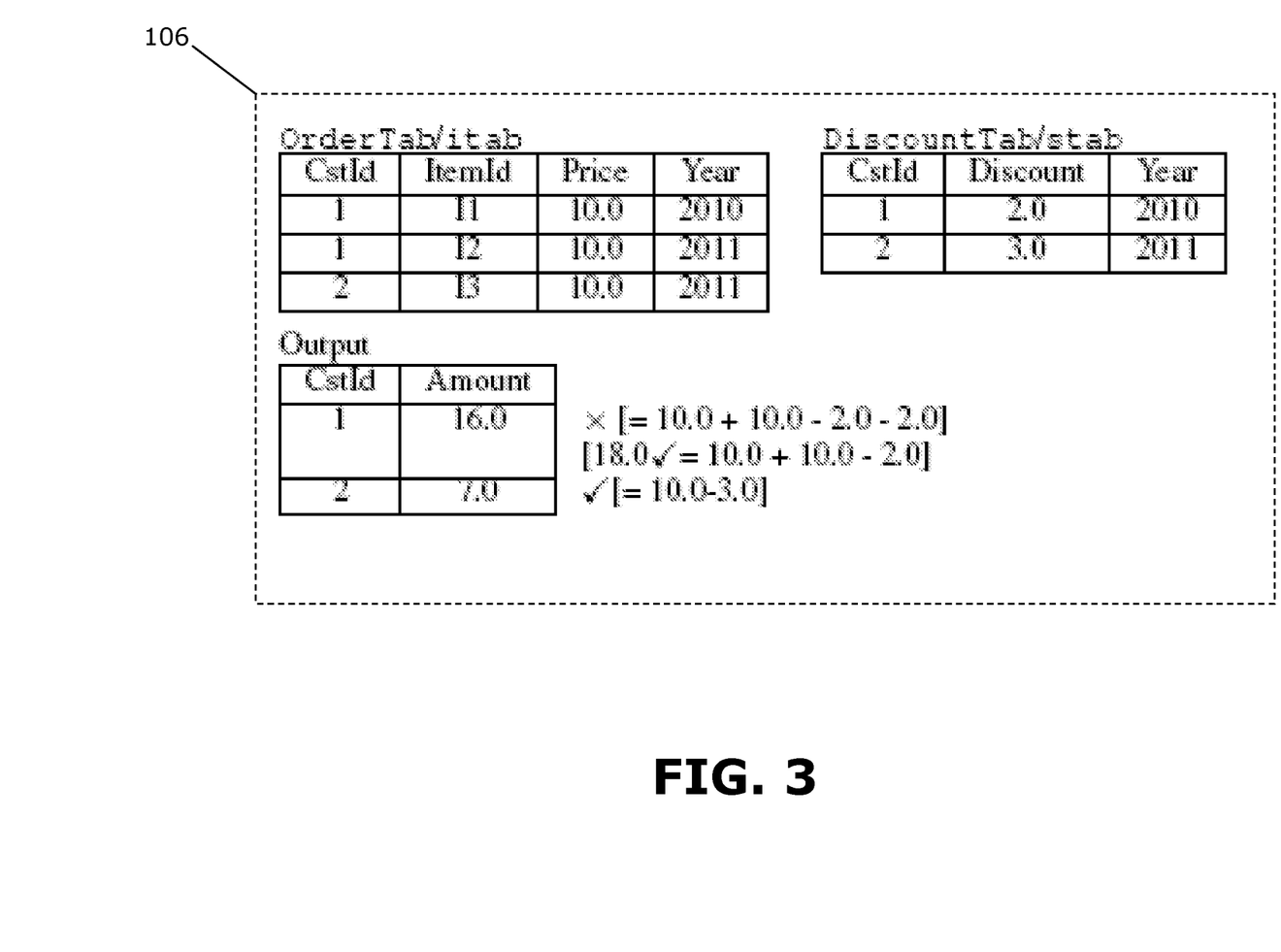
FIG. 3 provides a set of sample input and output data combinations for the program of FIG. 1.
Figure 4:
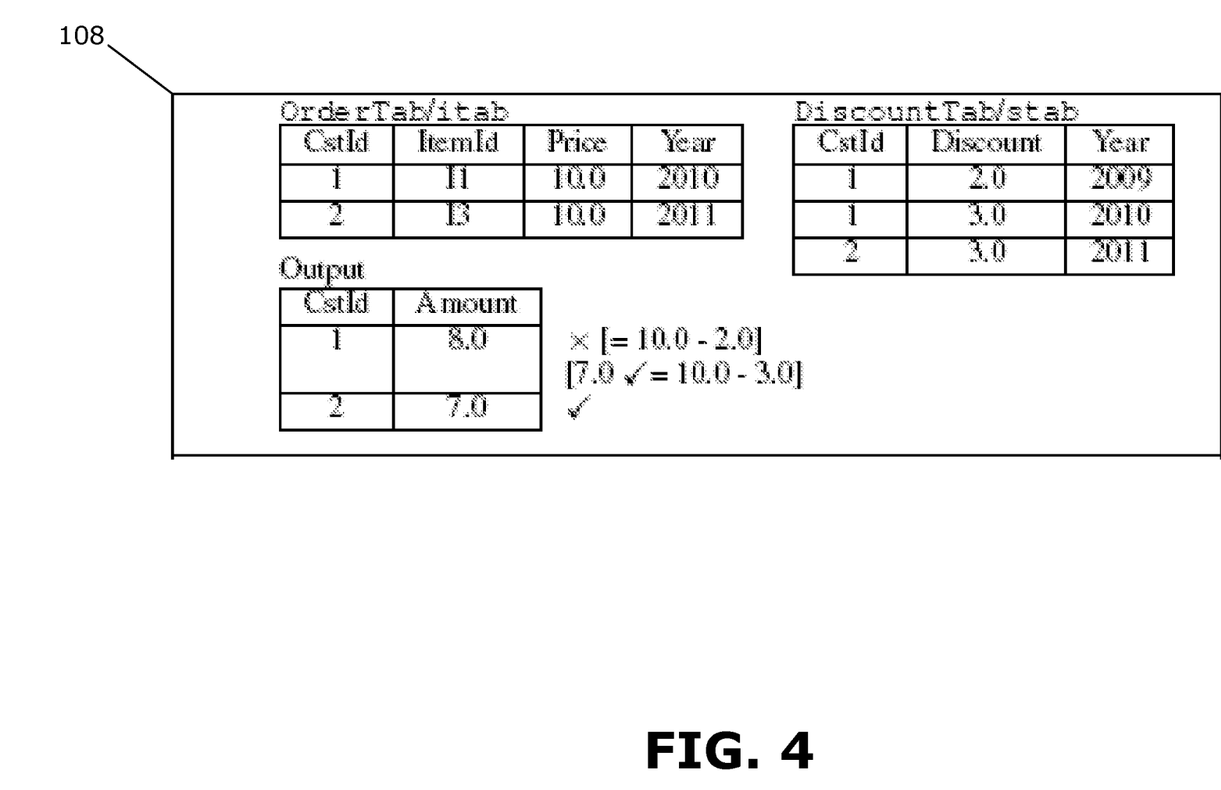
FIG. 4 provides another set of sample input and output data for the program of FIG. 1.

In accordance with at least one embodiment of the invention, FIG. 1 shows a sample program 102 written in ABAP. FIGS. 2-4 further relate to the sample program 102 in FIG. 1, such that simultaneous reference can continue to be made to all of FIGS. 1-4. As such, FIG. 2 provides a flow chart 104 explaining the steps of each of commands of the program 102. The program 102 represents a business application that creates a report of orders placed by different customers.

In accordance with at least one embodiment of the invention, FIG. 3 shows a set 106 of sample input and output data combinations from the program 102. Each correct output row is followed by a ✓ (check mark). The output row that is considered incorrect is marked with a x and is followed with the expected correct output. The OrderTab table contains the order details such as customer who placed the order CstId, item ordered ItemId, its price Price and year in which the order was placed Year. The DiscountTab table contains the discount applicable per customer per year. For each customer, the output shows the total order amount.

In accordance with at least one embodiment of the invention, at the code level, the program 102 first reads the input data from OrderTab and DiscountTab (in data set 106) into internal tables itab, stab (lines 1,2), sorts table itab (line 4) and deletes records older than year 2010 (line 5). The CurrentYear variable is a parameter to the program and has value 2011. The program then loops over the contents of itab (line 6), sums up the Price (line 10), subtracts any relevant Discount (line 13) and prints out the total (line 16). One output entry is generated for each unique CstId present in the input OrderTab.

In accordance with at least one embodiment of the invention, FIG. 4 shows a set 108 of sample input and output data for the program of FIG. 1, by way of illustrating semantic differencing as a possible method of resolution. Here, slices for both the output records are the same. The actual difference is in the behavior of line 11 in its two different executions. The READ statement in ABAP program 102 returns only a single matching record. If there exist multiple records that match the selection criterion (WHERE clause), then it returns the first one. For CstId=1, line 11 would need to select from two records, while for CstId=2, there is only one matching record. Hence, the behaviors of the READ statement for these two keys are different.

In accordance with at least one embodiment of the invention, a semantic differencing algorithm identifies such statements in the execution trace where different behavior of the command/statement have been exercised in the correct and incorrect slices and highlights them as potential faults. In the current, non-restrictive example, the fix is to change the READ (line 11) as READ stab INTO fa WHERE CstId=wa.CstId and Year=wa.Year such that appropriate year-wise discount is availed.

Generally, it can be appreciated that conventional efforts tend just to take into account whether a statement appears in one slice but not in another one, not the manner in which it appears in a slice. As such, semantic differencing can contribute yet another attribute of statement execution, where the behavior of statement execution on specific input data is taken into account.

In terms of one conventional effort, sequence-based differencing aims to identify statements that contribute towards computation of the incorrect result and do not contribute to the computation of at least one correct result. To realize the presence of such statements there is a two step process involving: grouping correct and incorrect slices into equivalence classes; and performing pair-wise differencing between the representative elements of the correct and incorrect equivalence classes. In data-centric programs it is common to find the slices containing traces of same set of statements, but differing in the number of iterations of the some loops. Thus, while creating equivalence classes in correct and incorrect slices, in accordance with at least one embodiment of the invention there is broadly contemplated the combination of two slices into the same class if they are exactly same or if they have different number of iterations of the same statements in a loop. Generating equivalence classes in correct and incorrect slices reduces the number of pair-wise comparisons required to find differences between slices. Also, while undertaking sequence-based differencing of two slices, one from a correct equivalence class and another from an incorrect equivalence class, any difference of statements executed in the sequences of statement occurrences is noted. However, due to the common nature of loop-iteration differences (such as, different number of loop iterations), these differences are given lower priority among all sets of pair wise differences.

When considering sequence-based differencing, and as discussed above, an incorrect slice may not show any important difference compared to correct slices. This is possible if a statement exhibits different "behaviors" in two slices due to the nature of input data to the statement. Such difference in behavior can be referred to as a semantic difference, and such differences (along with measures for their detection) are illustrated herebelow, with continued reference to the present illustrative example.

By way of illustrating the functioning and effects of sequence-based differencing, one can consider the sample program 102 presented in FIG. 1 and the corresponding test case shown in FIG. 4 (based on data set 108). In this example corresponding to the CstId=1 there are two rows in stab. In the READ statement at line 11 of program 102, when the selection condition is satisfied with multiple rows, then the first (lowest index) matching row is selected based on ABAP semantics. As such, in the present example, the first row is selected with Discount=2.0, which results in output 8.0 instead of the correct output 7.0 corresponding to CstId=1. Sequence-based differencing does not find any difference between data slices taken for both output rows. As will now be appreciated, embodiments of the invention admirably address and overcome this significant disadvantage.

As such, in accordance with at least one embodiment of the invention, in employing semantic differencing, it can be assumed that there must exist a faulty statement in the program that appears both in the correct and incorrect slices, such that it fortuitously exhibits the intended semantics in the correct slices, but deviates from the intended semantics (based on programmer intent) in the incorrect slice (keeping in mind that the fortuitous correct behavior in the correct slices is specific to the particular input data). Thus, an objective becomes to ascertain whether a statement has deviated from its intended semantics.

In accordance with at least one embodiment of the invention, corner-case differencing is contemplated broadly for carrying out semantic differencing. As such, the semantics of some of the statements of program 102 can be classified into two separate categories: a normal case, and one or more corner cases. (It should be understood here that only those statements with composite behavior are modeled.) For example, in a READ statement, the WHERE condition could match multiple rows, or just one row. Since the first matching row is returned by the READ, the matching of just one row among several candidates is a corner case. Thus, given a trace, one can tell if a statement executed in a corner-case manner, or in a normal case manner. Intuitively, this technique exploits the fact that most errors (typically seen in already-tested code) occur due to non-handling of corner cases that are revealed in the incorrect slices, and not revealed in the correct slice. Slicing determines whether there is any effect of a statement on a slice or not, while corner-case differencing aims to ascertain the semantic difference of a statement with respect to correct and incorrect slices where the statement has some effect in both the slices.

In accordance with at least one embodiment of the invention, in the present example with program 102 (FIG. 1) and data set 108 (FIG. 4), a corner-case difference is determined in the READ statement, such that in the event of a correct slice only a single row will satisfy the selection condition, while in the case of incorrect slice, the selection condition is satisfied with two rows. This difference is produced by looking at the semantics of READ statement and particularly evaluating the corner case aspect in two slices. Note that, in this case, the difference in behavior of the READ statement is indeed the particular behavior found using behavioral differencing. (In other words, for CstId=1, the READ statement matches two rows from the Discount table and selects one, whereas for CstId=2 it matches just one row and obtains that row. Thus, even though the data slices for both correct and incorrect output are same, the behavior of the READ statement is different with respect to the two, such that the READ statement can be annotated differently in both of the slices, thereby inducing a difference in the READ statements between the two slices.) The presence of this behavior (multiple satisfied selection) in READ is perennially a problem, as a programmer may intend to get the first matching row always, and may not agree to specify an extra field in selection condition which increases the overhead of the operation. The fact that this difference in behavior showed in correct and incorrect slices is the key observation.

From the foregoing, it can be appreciated that generally, in accordance with at least one embodiment of the invention, statement output behavior is modeled as a set of possible disjoint outcome categories. In a dynamic slice, statements are annotated with the actual outcome category applicable. Passing and failing executions are then differenced by comparing annotated dynamic slices, whereupon the fault is localized.

Figure 5:
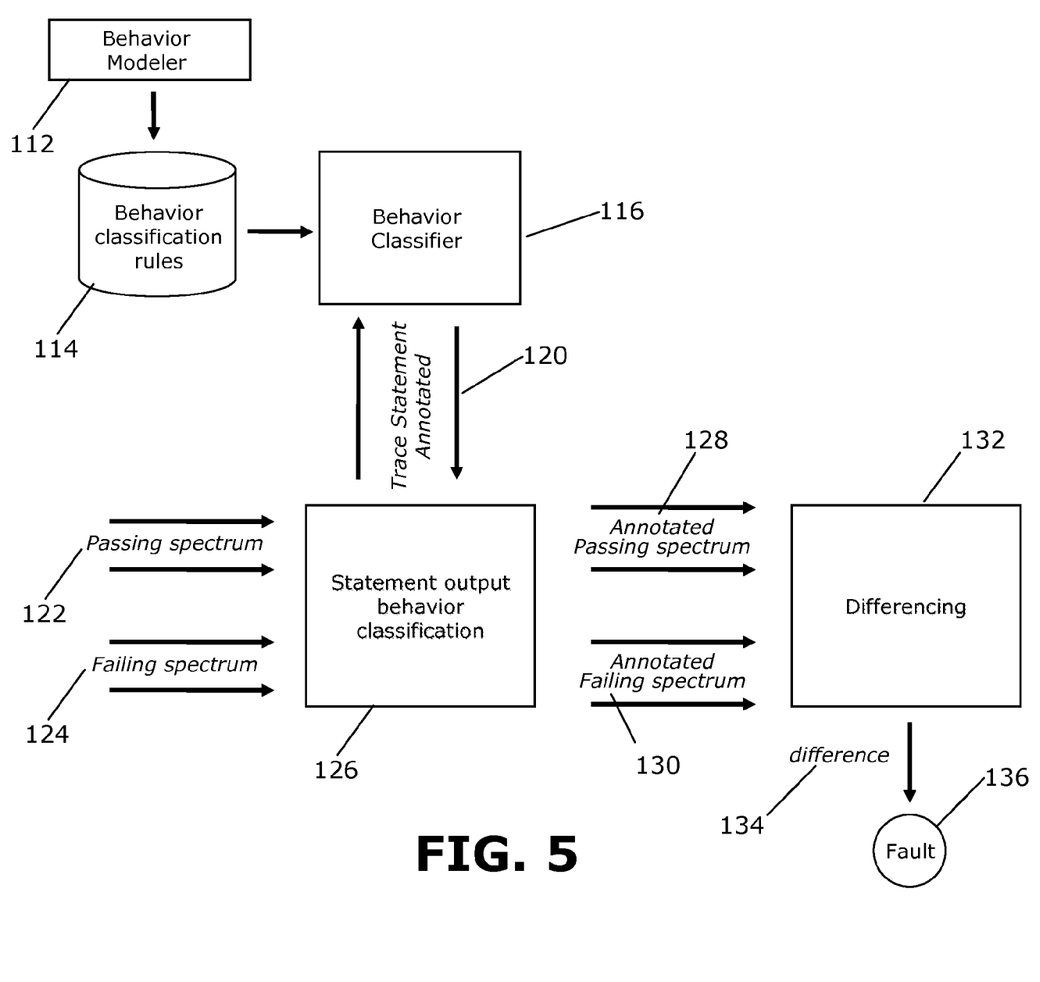
FIG. 5 schematically illustrates a system for localizing faults.

Framed another way, in accordance with at least one embodiment of the invention, there are broadly contemplated herein systems and methods for localizing program faults by modeling statement output behaviors, annotating statement occurrences by characterizing the observed behavior, and leveraging the annotations in differencing passing and failing spectra. A system, as schematically illustrated in FIG. 5, includes a behavior modeler 112, which, via stored behavior classification rules in a repository 114, permits describing the behavior of a statement type, with respect to a property P, as a set of behavior classes, where, a behavior class is a non-overlapping, fault-relevant, range or set of possible values of property P. The behavior modeler 112 allows for the mapping of a given statement type to a set of classification rules. Each classification rule (for property P) in this set is a computation expression that uses static (e.g., types and definitions) and dynamic (e.g., input and output) properties of the statement, along with general domain relevant functions (such as sort, query, sizeOf . . . etc.).

Also included, in accordance with at least one embodiment of the invention, is a behavior classifier 116 which retrieves the set of classification rules for a specified statement occurrence, or trace statement from the repository 114. The behavior classifier 116 then executes the classification rules, to obtain the applicable behavior classes for the statement occurrence. Thence, the behavior classifier annotates (120) the statement occurrence with the behavior classes. As a result, in statement output behavior classification (126), passing (122) and failing (124) input spectra are annotated (128 and 130, respectively), to permit differencing 132 and thus precise comparison between the annotated passing (128) and failing (130) slices of execution, to yield a difference 134 which localizes the fault 136.

Figure 6:
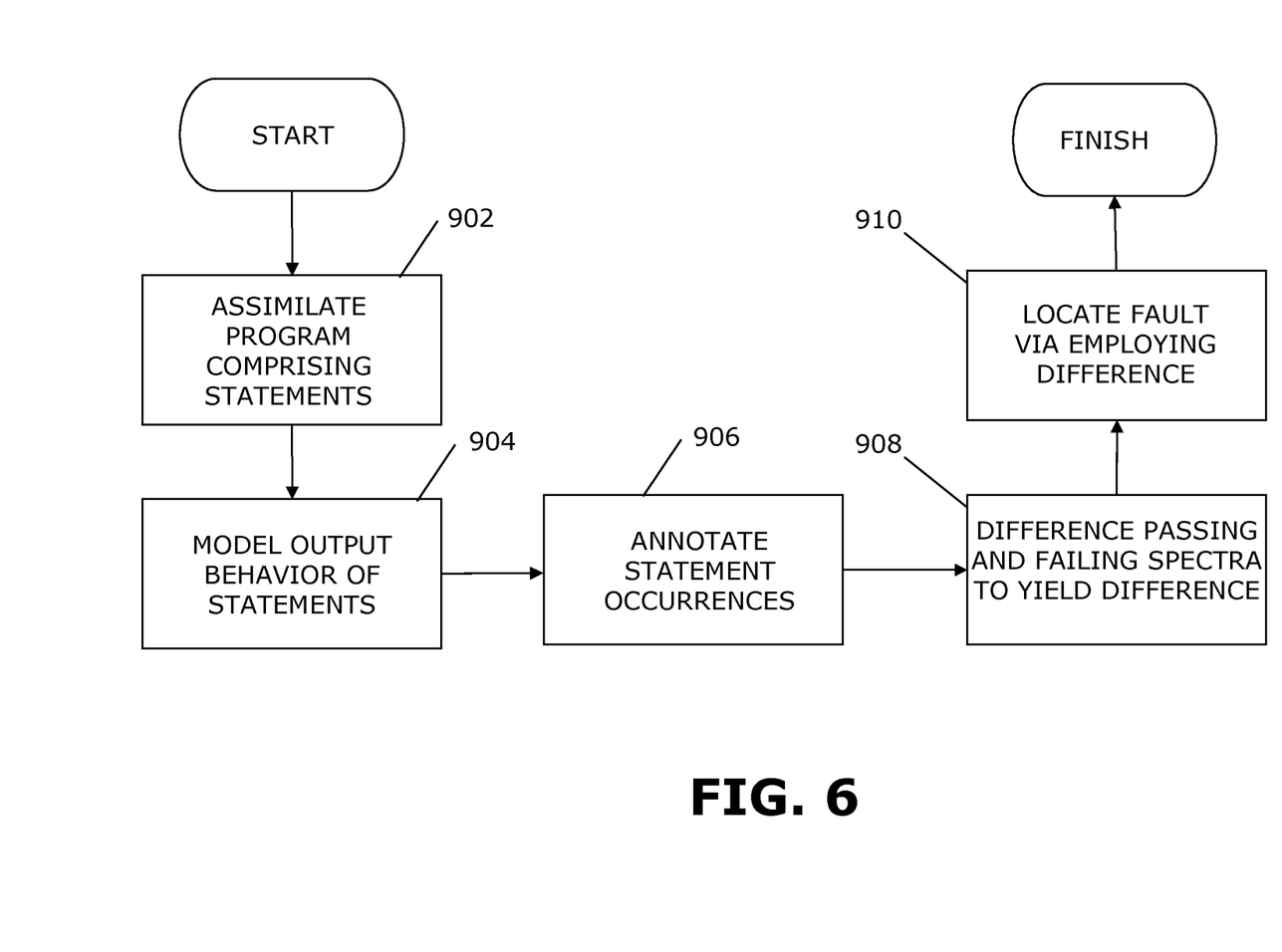
FIG. 6 sets forth a process more generally for localizing faults in programs.

FIG. 6 sets forth a process more generally for localizing faults in programs, in accordance with at least one embodiment of the invention. It should be appreciated that a process such as that broadly illustrated in FIG. 6 can be carried out on essentially any suitable computer system or set of computer systems, which may, by way of an illustrative and on-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

As shown in FIG. 6, a program is assimilated (902), the program comprising statements. Output behavior of the statements is modeled (904), and statement occurrences are annotated (906). Passing and failing spectra are differenced to yield a difference (908), and a fault is located via employing the difference (910).

Figure 7:
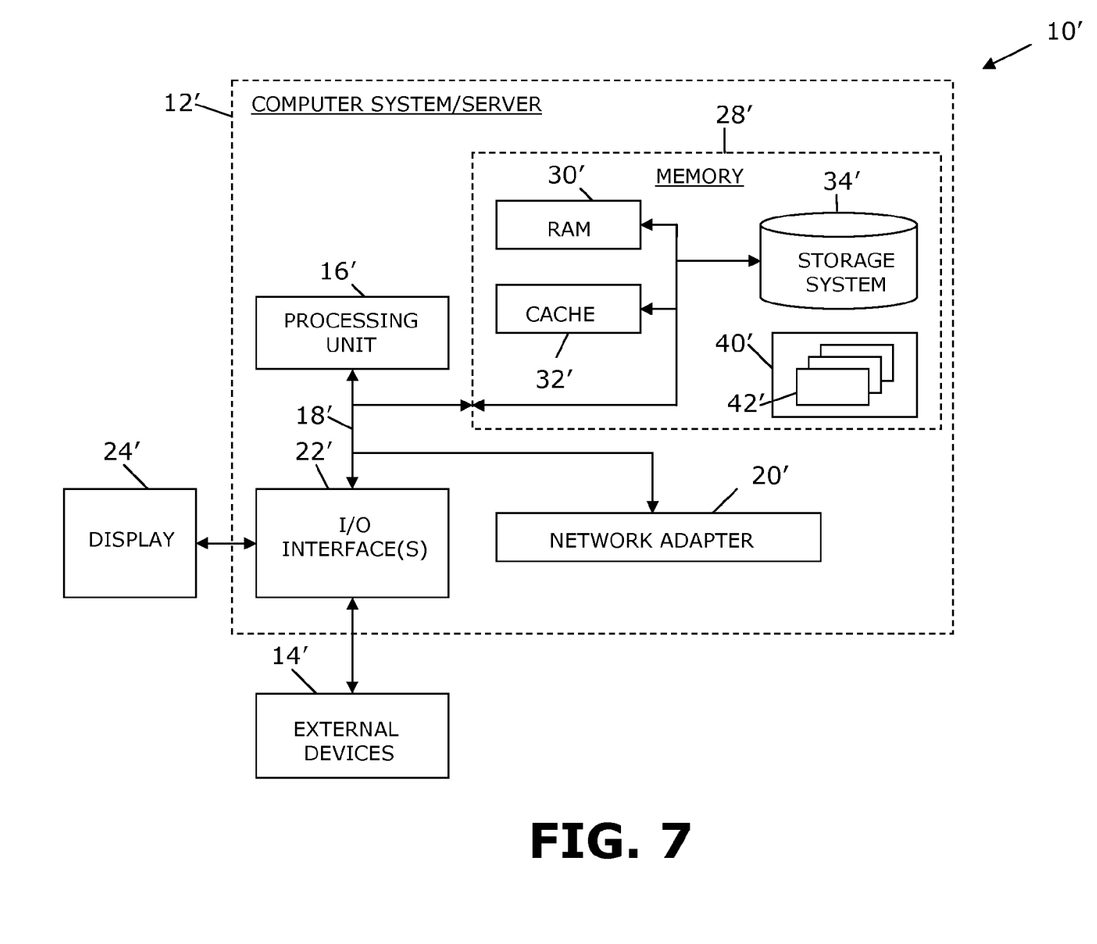
FIG. 7 illustrates a computer system.

Referring now to FIG. 7, a schematic of an example of a cloud computing node is shown Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
assimilating a program, the program comprising statements, each statement comprising at least one statement type;
modeling output behavior of an occurrence of one of the statements;
said modeling comprising:
mapping a statement type, of the one of the statements, to behavior classification rules stored in a repository; and
describing the behavior of the mapped statement type with respect to a property as a set of behavior classes, each behavior class comprising a non-overlapping, fault-relevant set of possible values of the property;
each behavior classification rule comprising:
a computation expression; and
at least one domain-relevant function;
executing the mapped behavior classification rules and thereby obtaining behavior classes for the statement occurrence;
annotating the statement occurrence with the behavior classes;
said annotating comprising annotating passing and failing input spectra;
differencing the annotated passing and failing input spectra to yield a difference; and
localizing a fault via employing the difference.

2. The method according to claim 1, wherein said differencing comprises employing annotations from said annotating.

3. The method according to claim 1, wherein said annotating comprises annotating the statement occurrence with the behavior classes corresponding to the statement occurrence.

4. An apparatus comprising:
at least one processor; and
a computer readable storage medium having computer readable program code embodied therewith and executable by the at least one processor, the computer readable program code comprising:
computer readable program code configured to assimilate a program, the program the program comprising statements, each statement comprising at least one statement type;
computer readable program code configured to model output behavior of an occurrence of one of the statements via:
mapping a statement type, of the one of the statements, to behavior classification rules stored in a repository; and
describing the behavior of the mapped statement type with respect to a property as a set of behavior classes, each behavior class comprising a non-overlapping, fault-relevant set of possible values of the property;

each behavior classification rule comprising:
   a computation expression; and
   at least one domain-relevant function;
computer readable program code configured to execute the mapped behavior classification rules and thereby obtain behavior classes for the statement occurrence;
computer readable program code configured to annotate the statement occurrence with the behavior classes, via annotating passing and failing input spectra;
computer readable program code configured to difference the annotated passing and failing input spectra to yield a difference; and
computer readable program code configured to localize a fault via employing the difference.

5. The apparatus according to claim 4, wherein said computer readable program code is configured to difference via employing annotations from said annotating.

6. A computer program product comprising:
a computer readable storage medium having computer readable program code embodied therewith, the computer readable program code comprising:
computer readable program code configured to assimilate a program, the program comprising statements, each statement comprising at least one statement type;
computer readable program code configured to model output behavior of an occurrence of one of the statements via:
   mapping a statement type, of the one of the statements, to behavior classification rules stored in a repository; and
   describing the behavior of the mapped statement type with respect to a property as a set of behavior classes, each behavior class comprising a non-overlapping, fault-relevant set of possible values of the property;
each behavior classification rule comprising:
a computation expression; and
at least one domain-relevant function;
computer readable program code configured to execute the mapped behavior classification rules and thereby obtain behavior classes for the statement occurrence;
computer readable program code configured to annotate the statement occurrence with the behavior classes, via annotating passing and failing input spectra;
computer readable program code configured to difference the annotated passing and failing input spectra to yield a difference; and
computer readable program code configured to localize a fault via employing the difference.

7. The computer program product according to claim 6, wherein said computer readable program code is configured to difference via employing annotations from said annotating.

8. The computer program product according to claim 6, wherein said computer readable program code is configured to annotate the statement occurrence with the behavior classes.

* * * * *